US008326835B1

United States Patent
Munter

(10) Patent No.: US 8,326,835 B1
(45) Date of Patent: Dec. 4, 2012

(54) CONTEXT-SENSITIVE PAGINATION AS A FUNCTION OF TABLE SORT ORDER

(75) Inventor: Aaron D. Munter, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 577 days.

(21) Appl. No.: 12/326,788

(22) Filed: Dec. 2, 2008

(51) Int. Cl.
*G06F 17/30* (2006.01)

(52) U.S. Cl. ........ 707/737; 707/738; 707/740; 707/751; 707/752; 707/753; 707/754

(58) Field of Classification Search .................. 707/752, 707/753, 754, 999.003, 999.004, 999.007, 707/737, 738, 740, 751

See application file for complete search history.

(56) References Cited

U.S. PATENT DOCUMENTS

| | | | |
|---|---|---|---|
| 5,390,354 A | 2/1995 | de Heus et al. | |
| 6,105,044 A | 8/2000 | DeRose et al. | |
| 6,385,602 B1 | 5/2002 | Tso et al. | |
| 6,968,329 B1 | 11/2005 | Chung et al. | |
| 7,143,362 B2 | 11/2006 | Dieberger et al. | |
| 7,146,367 B2 * | 12/2006 | Shutt .............................. | 709/217 |
| 7,359,902 B2 | 4/2008 | Ornstein et al. | |
| 7,363,303 B2 | 4/2008 | Cipriano et al. | |
| 7,426,481 B1 * | 9/2008 | Connors et al. .............. | 705/26.5 |
| 7,426,687 B1 * | 9/2008 | Schultz et al. ................. | 715/208 |
| 7,885,981 B2 * | 2/2011 | Kaufman et al. ............. | 707/802 |
| 7,890,519 B2 * | 2/2011 | Dettinger et al. ............. | 707/752 |
| 2003/0217034 A1 * | 11/2003 | Shutt ................................. | 707/1 |
| 2006/0004725 A1 * | 1/2006 | Abraido-Fandino .............. | 707/3 |
| 2006/0036567 A1 * | 2/2006 | Tan ................... | 707/1 |
| 2006/0117002 A1 * | 6/2006 | Swen ................... | 707/4 |
| 2007/0043595 A1 * | 2/2007 | Pederson ......................... | 705/2 |
| 2007/0078853 A1 * | 4/2007 | Shutt ............................ | 707/8 |
| 2007/0083515 A1 * | 4/2007 | Gwizdaloski ..................... | 707/7 |
| 2007/0208751 A1 | 9/2007 | Cowan et al. | |
| 2008/0005118 A1 * | 1/2008 | Shakib et al. ................... | 707/10 |
| 2008/0046462 A1 * | 2/2008 | Kaufman et al. ............. | 707/102 |
| 2008/0148192 A1 | 6/2008 | Read et al. | |
| 2008/0163133 A1 | 7/2008 | Martinez et al. | |
| 2008/0281904 A1 * | 11/2008 | Conrad et al. ................. | 709/203 |
| 2009/0083224 A1 * | 3/2009 | Dettinger et al. .................. | 707/3 |
| 2009/0171813 A1 * | 7/2009 | Byrne et al. ..................... | 705/27 |
| 2010/0088314 A1 * | 4/2010 | Kuang ......................... | 707/733 |
| 2010/0223134 A1 * | 9/2010 | Lunenfeld .................. | 705/14.54 |

\* cited by examiner

*Primary Examiner* — Thanh-Ha Dang

(74) *Attorney, Agent, or Firm* — Schwegman Lundberg Woessner P.A.

(57) ABSTRACT

A method and system for presenting a dataset with context-sensitive pagination are described. The dataset is sorted and divided into subsets according to a first attribute, and the subsets are presented via a user interface, which contains a navigation control relating to the first attribute. When the dataset is sorted and divided according to a second attribute, the navigation control dynamically updates to relate to the second attribute. This allows a user to navigate pages of data in a manner consistent with chosen sorting criteria.

27 Claims, 8 Drawing Sheets

| Product Name | Version | Platform 407 | Language 408 | Part number | Estimated street price |
|---|---|---|---|---|---|
| Product A | 1 | Mac | English | 410 | 412 $29 |
| Product G | 4 | Mac | English | | $99 |
| Product Dd | 5 | Mac | English | | $99 |
| Product H | 2 | Mac | English | | $99 |
| Product J | 3 | Mac | English | | $199 |
| Product Jj | 5 | Mac | English | | $199 |
| Product Ji | 6 | Mac | English | | $199 |
| Product Jz | 9 | Mac | English | | $199 |
| Product L | 8 | Win | English | | $199 |
| Product M | 2 | Win | English | | $199 |
| Product Ma | 4 | Win | English | | $199 |
| Product Nm | 2 | Win | English | | $199 |
| Product Oo | 1 | Win | English | | $199 |
| Product Pz | 1 | Mac | English | | $199 |
| Product Qm | 4 | Linux | English | | $$199 |
| Product Qr | 2 | Win | English | | $199 |
| Product Zi | 2 | Mac | English | | $$199 |

Previous $0-199 $200-299 $300-699 $700-899 $700-899 $700-899 $900-1500 $1500-2000 $2500+ Next

*FIG. 4*

| Product Name | Version | Platform | Language | Part number | Estimated street price |
|---|---|---|---|---|---|
| Product A | 1 | Mac | English | | $599 |
| Product Ab | 4 | Mac | English | | $599 |
| Product Ac | 5 | Mac | English | | $499 |
| Product Ad | 2 | Mac | English | | $499 |
| Product Ae | 3 | Mac | English | | $799 |
| Product Af | 5 | Mac | English | | $299 |
| Product Ag | 6 | Mac | English | | $399 |
| Product Ah | 9 | Mac | English | | $599 |
| Product Ai | 8 | Win | English | | $89 |
| Product Aii | 2 | Win | English | | $899 |
| Product Aj | 4 | Win | English | | $899 |
| Product Ajk | 2 | Win | English | | $899 |
| Product Ak | 1 | Win | English | | $299 |
| Product Al | 1 | Mac | English | | $399 |
| Product Am | 4 | Linux | English | | $49 |
| Product Amm | 2 | Win | English | | $699 |
| Product Az | 2 | Mac | English | | $129 |

*FIG. 5*

CONTEXT-SENSITIVE PAGINATION AS A FUNCTION OF TABLE SORT ORDER

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2008, ADOBE SYSTEM INCORPORATED, All Rights Reserved.

BACKGROUND

Currently, large sets of data are often handled by breaking the set into several pages, a process known as pagination. The controls used to navigate these subsets allow a user to page through the data as a function of an equal percentage of total pages. For example, if there are 2000 total data items and 20 data items can fit on each page, the data items will be divided into 100 pages. When the user navigates to a page, a new view is determined by skipping 20 data items for each previous page of data. This division is arbitrary.

Further, when the user sorts the set of data items (e.g., using an interface where the data can be sorted on column headers), the user now has a context in which to look for information: sorting by name would indicate a preference to find information alphabetically, sorting by price would indicate a preference for finding information by price, and sorting by time would indicate a preference for searching by temporal means. However, the pagination process remains based upon equal divisions of the length of the list, and the control mechanism only allows navigation by page number.

BRIEF DESCRIPTION OF DRAWINGS

Some embodiments are illustrated by way of example and not limitation in the figures of the accompanying drawings in which:

FIG. 4 is a user interface diagram illustrating a user interface, according to some example embodiments, presenting a dataset that is sorted by estimated street price and divided into pages with a price-sensitive navigation control.

FIG. 5 is a user interface diagram illustrating a user interface, according to some example embodiments, presenting a dataset, sorted by product name, and divided into pages with an alphabetical navigation control.

DETAILED DESCRIPTION

Figure 1:
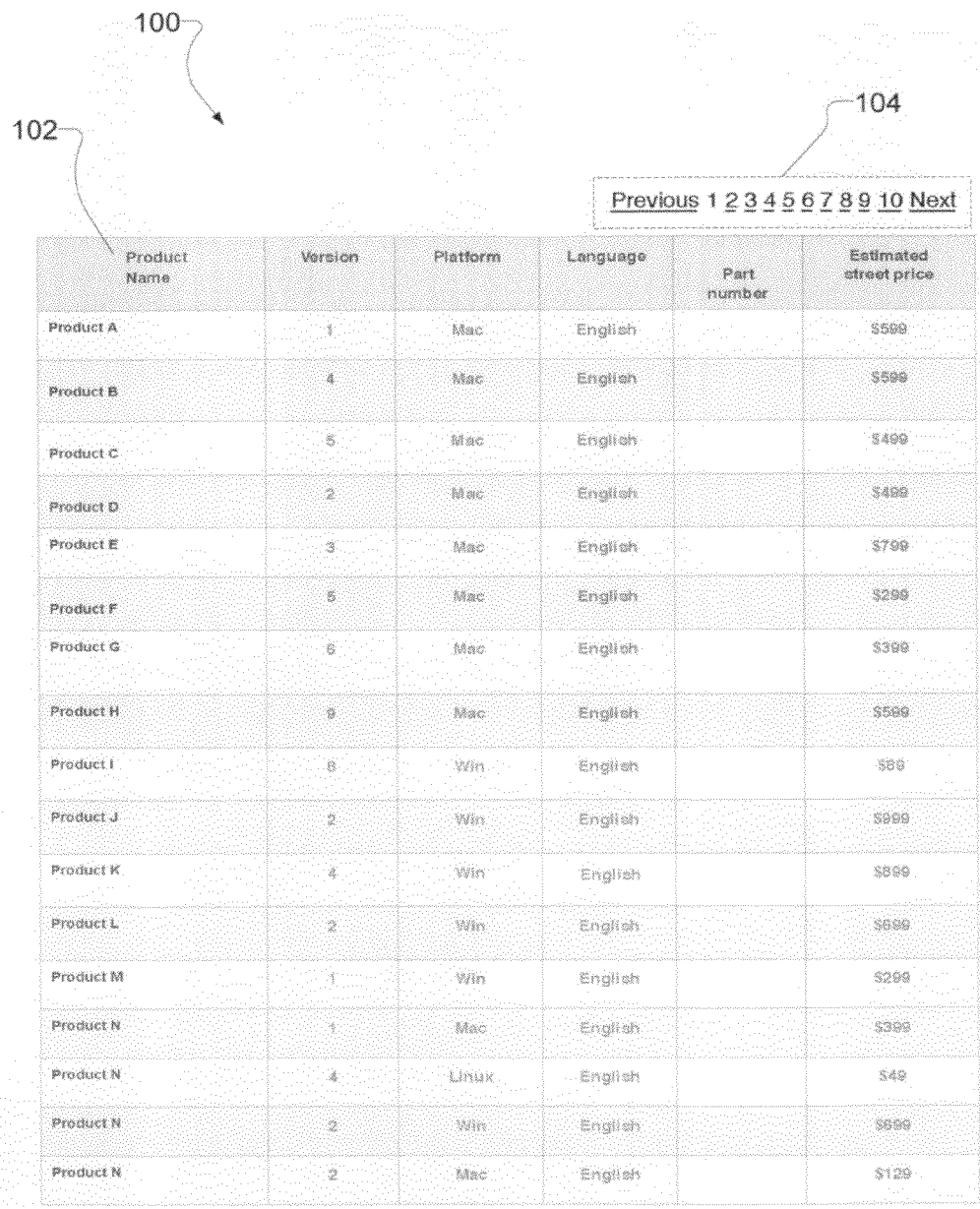
FIG. 1 is a user interface diagram showing a dataset divided into pages with a navigation control containing links to each page.

In the following description, for purposes of explanation, numerous specific details are set forth in order to provide a thorough understanding of some example embodiments. It will be evident, however, to one skilled in the art that the present invention may be practiced without these specific details.

Some example embodiments enable a user to sort a set of data and then navigate through the resulting subsets based on the criterion used to sort the set, rather than by arbitrary division. More specifically, the navigation features of the user interface change to match the context of the sorting criterion, instead of always displaying the same navigation scheme regardless of the sorting criterion.

In one example embodiment, a data component retrieves a dataset from a database or a real time data feed (e.g., stock price information), and a sort component sorts the dataset according to a first attribute (e.g., product name, price, version number) into a first order. A pagination component divides the dataset into subsets, at least a portion of which are presented to a user, via a user interface, in the first order. Additionally, an interface component presents a first navigation control, via the user interface. The first navigation control relates to the first attribute and controls navigation between the subsets (e.g., a user may navigate between subsets of data alphabetically if the first attribute is product name).

The sort component similarly sorts the dataset according to a second attribute into a second order, and the pagination component divides the dataset into further subsets, which are displayed in the second order. A second navigation control relating to the second attribute is presented and controls navigation between the further subsets (e.g., a user may now navigate between subsets of data numerically if the second attribute is price).

In one example embodiment, dividing the dataset into subsets comprises paginating the dataset (e.g., breaking up a long list of data items into smaller units of data items and presenting a pagination control to navigate through the smaller units of data items). This pagination operation generates a number of presentation pages, each of the number of presentation pages including a respective subset of the first plurality of subsets.

In some example monomers, the first attribute may be an alphabetic attribute, a numeric attribute, or an alphanumeric attribute, and the first navigation control displays a number of attribute values that are associated with respective subsets. Furthermore, each of the number of attribute values is user-selectable to navigate to an associated subset of the first plurality of subsets.

A navigation anchor may be associated with each of the subsets of the subsets, and the presentation of the navigation control may include presenting a plurality of navigation indicia, each associated with the respective navigation anchor, that are user-selectable to navigate to an associated navigation anchor.

In one example embodiment, the division of the dataset may be such that substantially all of the subsets include an equal number of data items of the dataset.

According to some example embodiments, the presenting of at least the first portion of the dataset via the user interface comprises displaying the dataset in a table having a number of columns, each of the columns being associated with a respective attribute of a number of attributes of data items included within the dataset. These example embodiments may further include receiving user-input of the first attribute, and performing the sorting of the dataset according to the first attribute responsive to the receiving of the user input of the first attribute (e.g., detecting user selection of a column of the table associated with the first attribute).

According to some embodiments, presenting a dataset uses a sort component to sort the dataset according to a first criterion to generate a first sorted dataset. An interface component presents at least a portion of the first sorted dataset within a user interface and also presents the first navigation control to navigate between a number of subsets of the first sorted dataset. The first navigation control includes a first number of user-selectable indicia, respectively associated with the number of subsets of the first sorted dataset, and the first number of user-selectable indicia each reflects a value for the first criterion.

According to some example embodiments, presenting the dataset may include sorting the dataset according to a second criterion to generate a second sorted dataset, presenting at least a portion of the second sorted dataset within the user interface, and replacing the first navigation control with a second navigation control to navigate between the number of subsets of the second sorted dataset. The second navigation control may present a second number of user-selectable indicia, respectively associated with the number of subsets of the second sorted dataset, the second number of user-selectable indicia each incorporating a value for the second criterion according to which the second sorted dataset is sorted.

The result of presenting a dataset with context-sensitive pagination facilitates locating desired data in a large dataset. A standard pagination feature remains static whether a user sorts based on alphabetic values, numeric values, or any other criterion. A simple 'page 1, 2, 3 . . . ' navigation control is appropriate for some data types, but is unwieldy when searching for a specifically priced or named item, for example. In contrast, the context-sensitive pagination control dynamically changes based upon what column a user sorts on to be appropriate for the data in that column. If the user sorts by price, it is faster and more convenient to be able to see and navigate the resulting lists of data using a navigation control that contains price values.

Further details regarding the various example embodiments described above will now be discussed with reference to the figures accompanying the present specification.

FIG. 1 is a user interface diagram illustrating a user interface 100 presenting a portion of a dataset that is divided into pages, and that includes a page navigation control 104 containing links to each page. The dataset contains 10 total pages with 17 items listed per page, and a user may navigate to any of these pages using the page navigation control 104. The user may also sort the dataset using one of the columns 102 as a sort attribute. When sorted by a column 102, the dataset will be divided into new subsets by the sort attribute; however, in standard pagination, the page navigation control 104 remains static. For example, if the dataset is sorted alphabetically by product name, the page navigation control 104 will still display page links numerically as pages 1 through 10, despite the alphabetic sort.

Figure 2:
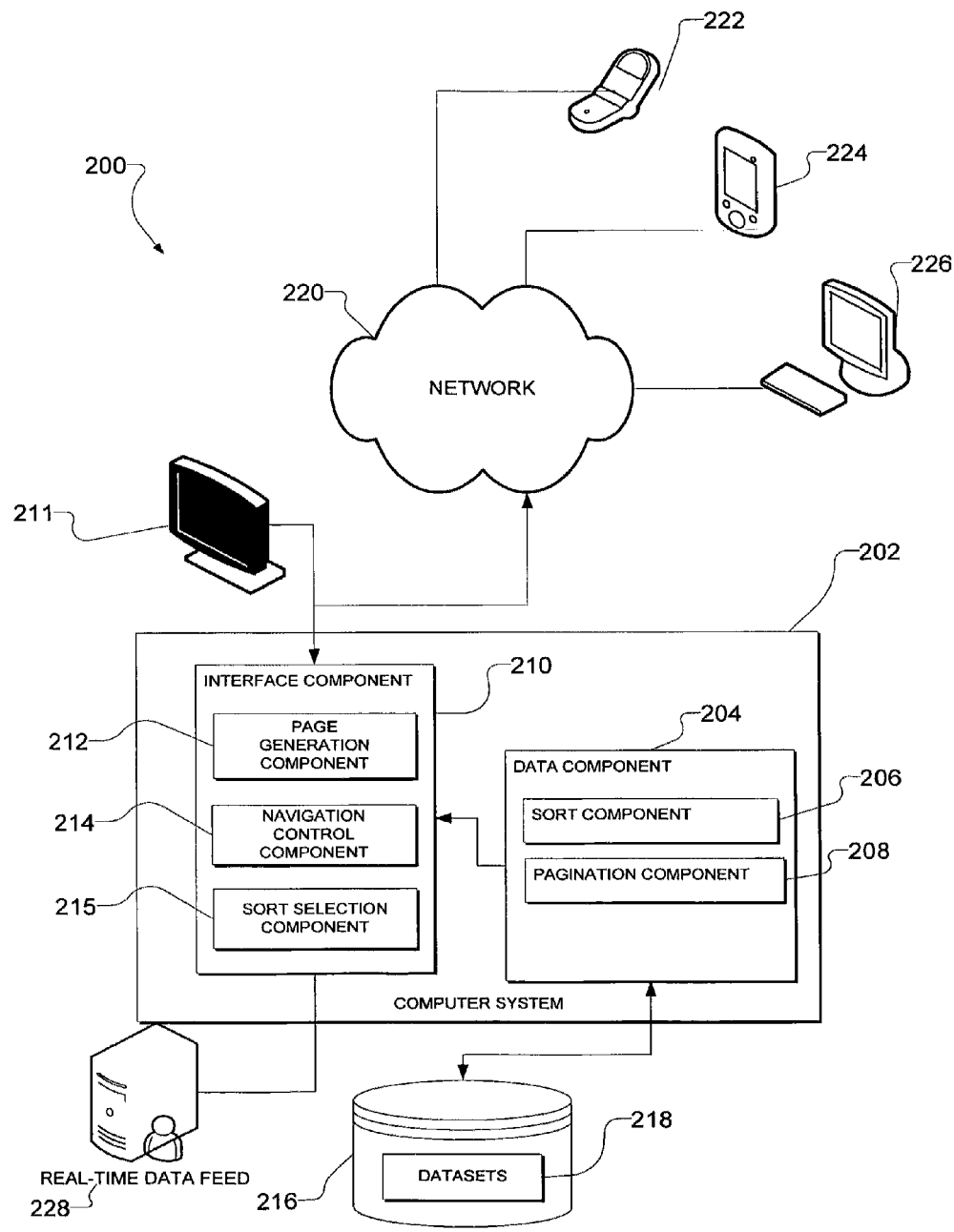
FIG. 2 is a block diagram illustrating a system, according to various example embodiments, within which context-sensitive pagination as a function of table sort order may be provided.

FIG. 2 is a block diagram illustrating a system 200, according to some example embodiments, within which context-sensitive pagination as a function of table sort order may be provided. The example system 200 employs a client-server architecture; however, various embodiments may also be executed directly on a local computer system 202 or in peer-to-peer or distributed computer systems. Furthermore, while certain functions, components and modules are shown to reside on single computer systems, these functions, components and modules may, in various embodiments, be distributed across any number of machines.

The system 200 includes a number of client devices (e.g., a mobile telephone 222, Personal Digital Assistant 224 (PDA), and a computer desktop system 226) that communicate via one or more networks 220 with the interface component 210 of a computer system 202. The client devices 222, 224, and 226 may host client applications (e.g., a web browser) that interact with the computer system 202. In other embodiments, a local display 211 is attached directly to the computer system 202 to interact with the interface component 210.

The computer system 202 hosts at least two components: an interface component 210 and a data component 204. These components operate within a computer application such as a data management tool, a spreadsheet program, or web-based software in order to provide context-sensitive pagination to that application. The interface component 210 generates user interfaces and user interface modules to present information, for example, within the context of client applications executing on client devices 222, 224, and 226 or directly to the local display 211. In one example embodiment, the interface component 210 is responsible for both the generation of pages with interface controls to navigate and sort data, and the layout of the data presented to the client device 222, 224, or 226 or the display 211. On each page, the interface component 210 allows a user to perform sorting operations on columns of data attributes and navigate between pages or data anchors based on the type of attribute used for sorting. To accomplish these functions, the interface component 210 includes a page generation component 212, a navigation control component 214, and a sort selection component 215. The page generation component 212 formats the rows and columns of data and controls the layout of the controls displayed on the page. The navigation control component 214 updates the navigation control presented within a user interface to provide access to subsets of data (e.g., through pagination or anchoring) in a context-sensitive manner, and the sort selection component 215 allows the user to choose columns of data on which to sort.

On the back end, the interface component 210 is coupled to the data component 204, which is responsible for the sorting and division of data into subsets. The data component 204 retrieves datasets 218 from a database 216 connected to the computer system 202. The sort component 206 receives the dataset 218 and an attribute type selection from the sort selection component 215 and orders the dataset 218 using the attribute type as a context (e.g., an alphabetic sort for a name attribute or a numeric sort for a price attribute). The pagination component 208 divides the sorted data into subsets that will be displayed by the interface component 210. In an example embodiment, the pagination component 208 counts the total number data items and separates the dataset 218 into a number of pages equal to the total items divided by the number of items that can be displayed on each page. In another embodiment, the pagination component 208 creates navigation anchors in the dataset 218 that allow navigation directly to the anchor in the user interface.

Figure 3:
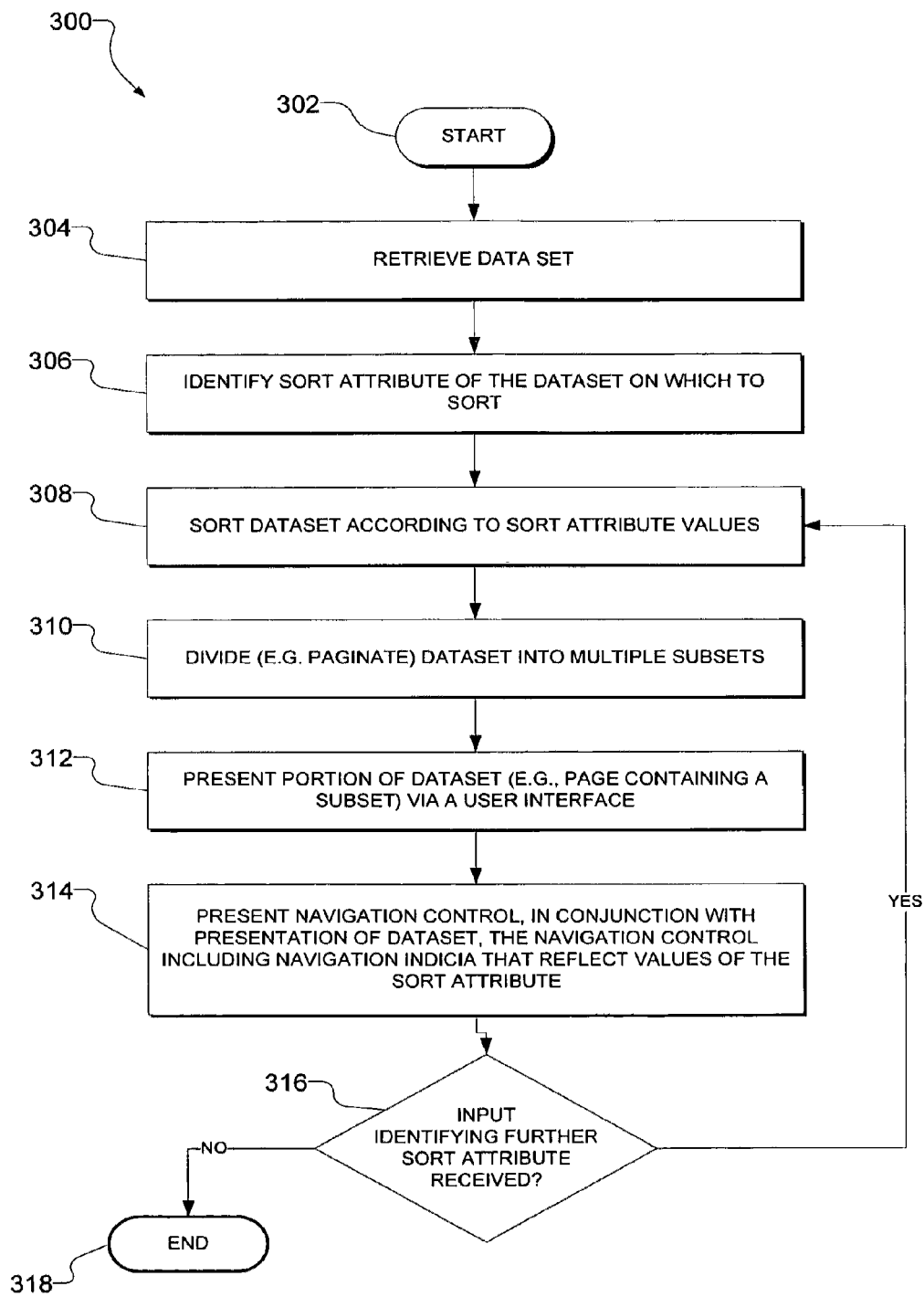
FIG. 3 is a flow chart illustrating a method, according to an example embodiment, of presenting a data set paginated in a context-sensitive manner.

FIG. 3 is a flow chart illustrating a method 300, according to an example embodiment, of presenting a dataset 218 paginated in a context-sensitive manner. While operations of the method 300 are described below as being performed by specific components, modules or systems of the computer system 202, it will be appreciated that these operations need not necessarily be performed by the specific components identified, and could be performed by a variety of components and modules, potentially distributed over a number of machines. Furthermore, the user may be operating the computer system 202 directly or accessing it remotely using a client device 222, 224, or 226 over one or more networks 220.

The method 300 commences at operation 302 and proceeds to operation 304, where, in an example embodiment, the dataset 218 is retrieved from the database 216. In another embodiment, data is retrieved from a real time data feed 228. At operation 306, the sort attribute of the dataset 218 is identified. This may be a default column chosen by the sort component 206 (e.g., the first column in the database) or a column chosen by the user through the sort selection component 215 on the interface. At operation 308, the sort component 206 orders the dataset 218 according to the identified sort attribute.

For example, turning to FIG. 4, if the user chooses to sort the dataset 218 by estimated street price 412 in ascending order, the sort component 206 will order the items of data beginning with the cheapest item and ending with the most expensive. In this example user interface 400, Product A is the cheapest item with a price of $29, therefore it is the first item displayed. The most expensive items in the dataset 218 cost more than $2500 and are located on the final page, which can be seen on the context-sensitive page navigation control 414 at the top of the page.

Returning to FIG. 3 at operation 310, the pagination component 208 divides the dataset 218 into multiple subsets. In one example embodiment, the subsets each contain the number of data items that can fit on a single page of the user interface 400, although the final subset may contain fewer items because it displays the remainder of the divided set. Alternatively, the pagination component 208 divides the dataset 218 into predetermined categories (e.g., one subset per letter of the alphabet or one subset for each increment of $100), which may result in subsets with unequal numbers of data items.

In another example, the dataset 218 is divided into subsets by associating navigation anchors with data items. As with the pagination example, these navigation anchors may divide the dataset 218 into predetermined categories such that there is one anchor for each letter of the alphabet. However, the anchors may also be used to partition the dataset 218 into equally sized subsets.

At operation 312, a user interface 400 containing a portion of the dataset 218 is presented to the user. In an example embodiment, the portion of the dataset 218 is a subset of data items that can fit on one page of the interface. Alternatively, the entire dataset 218 may be presented to the user in such a manner that it can be navigated through the use of the anchors.

At operation 314, the context-sensitive page navigation control 414 on the user interface 400 is presented to the user. The context-sensitive page navigation control 414 presents the subsets or navigation anchors in a manner consistent with the type of attribute used to sort the dataset 218. The context-sensitive page navigation control 414 allows the user to access the subsets previously created or jump directly to one of the navigation anchors. For example, if the user clicks on the $200-299 subset link 418 in FIG. 4, the list of items in that price range will be displayed on the user interface 400. The user may also navigate to the preceding subset using the previous link 416 or the next subset in order using the next link 420. The context-sensitive page navigation control 414 shown here is displayed in increments of price because the user sorted the dataset 218 using the estimated street price 412 as the sort criteria. The user may choose to sort based on any of the displayed columns on the user interface 400, such as product name 402, version 404, platform 407, language 408, or part number 410.

In FIG. 5, the user chooses to sort on a further sort attribute—the product name 402 (decision 316), which is an alphabetic attribute. The dataset 218 is sorted and divided according to operations 308 and 310, and the new page navigation control 514 displays the subsets alphabetically. In this example, the dataset 218 is divided such that there are an equal number of items in each subset; therefore, the page navigation control 514 displays products beginning with the letters 'B-D' 518 in a single subset. Also, if there were too many products beginning with the letter 'A' to be accommodated within a single page, the dataset 218 may be further divided into subsets such as 'AA-AS' and 'AT-B.' In another example, the dataset 218 is divided into a separate subset for each letter of the alphabet.

Figure 6:
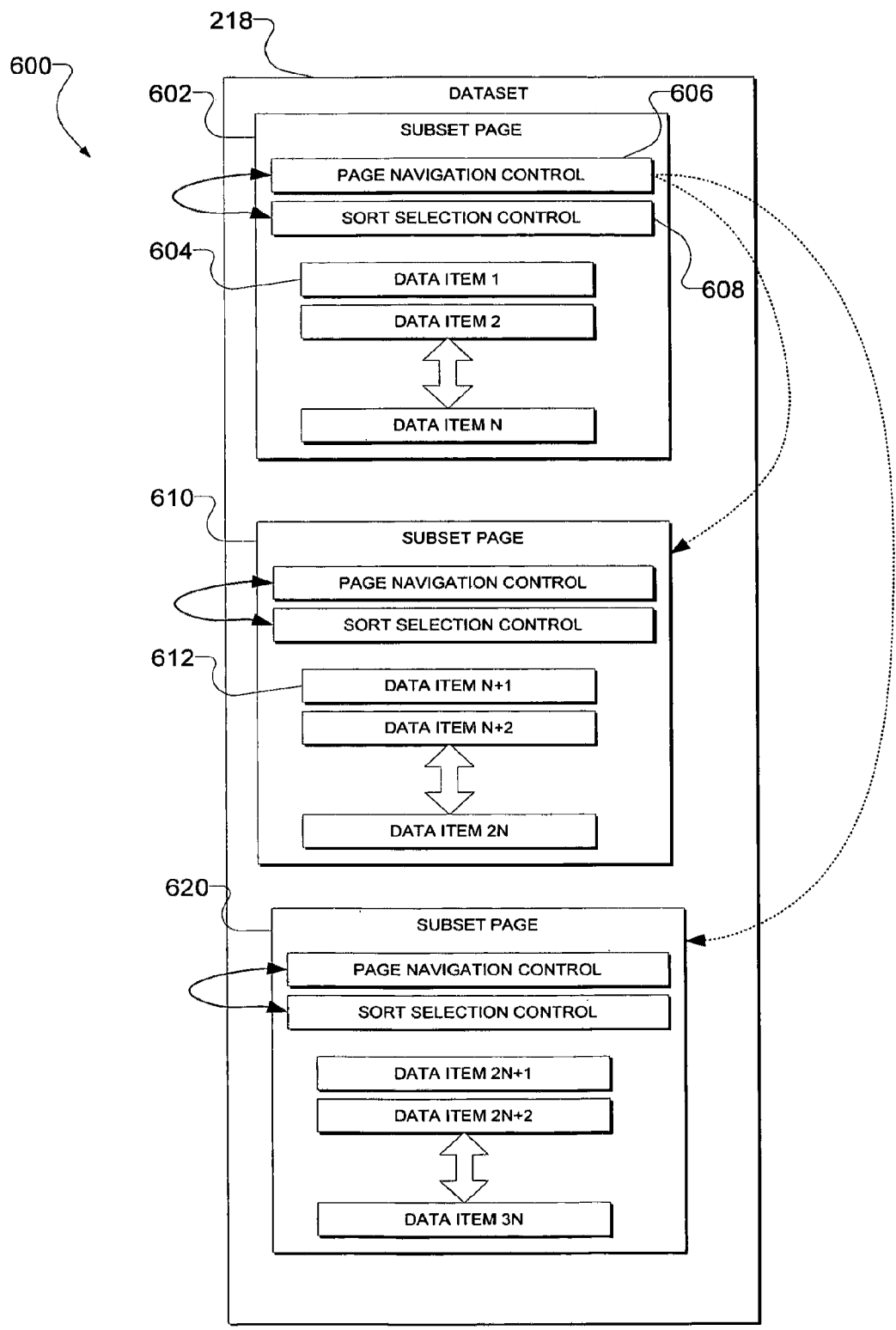
FIG. 6 is a block diagram illustrating a dataset divided into subset pages containing controls for sorting and navigating between the pages, according to some example embodiments.

FIG. 6 is a block diagram illustrating an organization 600, according to an example embodiment, of a dataset 218 divided into subset pages 602, 610, and 620. Each subset page contains a page navigation control 606 for navigating between the subset pages 602, 610, 620 and a sort selection control 608 for receiving from the user a choice of column on which to sort the dataset 218. In this example, the first subset page 602 contains N data items, which is the total number of items that can be displayed on the user interfaces 400 and 500. Data item 1 604 is the first data item in the sorted dataset 218 (e.g., Product A in FIGS. 4 and 5), and data item N is the final item on the first subset page 602. The second subset page 610 then begins with the next data item in the dataset 218, which is labelled as data item N+1 612.

Figure 7:
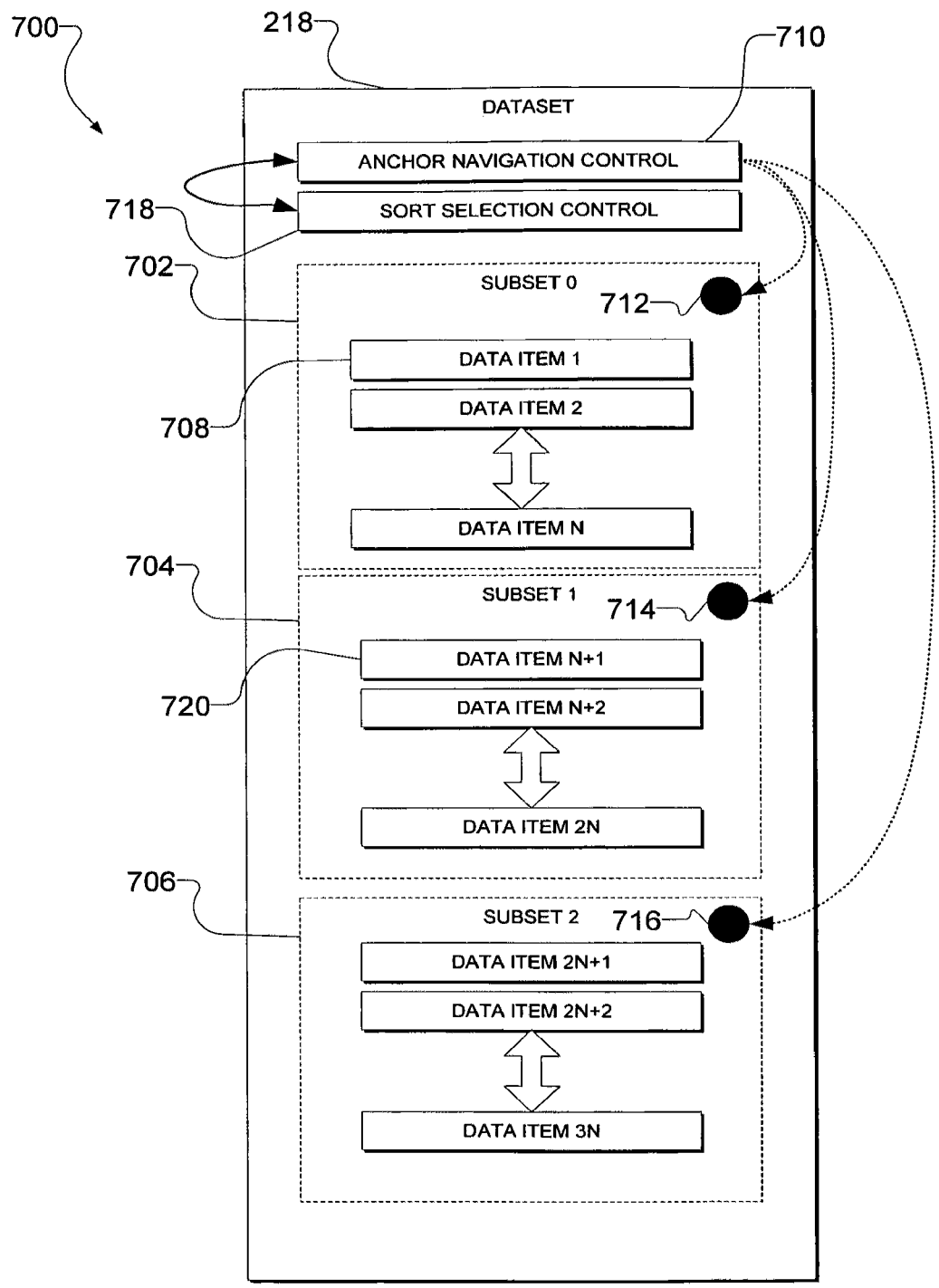
FIG. 7 is a block diagram illustrating a dataset divided into subsets navigable through navigation anchors associated with each subset, according to some example embodiments.

FIG. 7 is a block diagram illustrating an organization 700, according to an example embodiment, of a dataset 218 divided into subsets 702, 704, 706 accessible through navigation anchors 712, 714, 716 associated with each subset. Using anchors, the user is able to find desired data items in a long dataset 218 without having to scroll through an entire list. In one embodiment, all subsets 702, 704, 706 of the dataset 218 may be displayed on a single user interface page 400, 500. References to the navigation anchors 712, 714, 716 are stored in the anchor navigation control 710, which allows the user to jump to a specific subset. For example, selecting the subset 1 navigation anchor 714 from the anchor navigation control 710 displays to the user subset 1 704 of the dataset 218 beginning with data item N+1 720. Selecting the subset 2 anchor 716 displays to the user subset 2 706 of the dataset 218 beginning with data item 2N+1. A sort selection control 718 receives from the user a choice of column on which to sort the dataset 218.

Example Machine Architecture and Machine-Readable Medium

Figure 8:
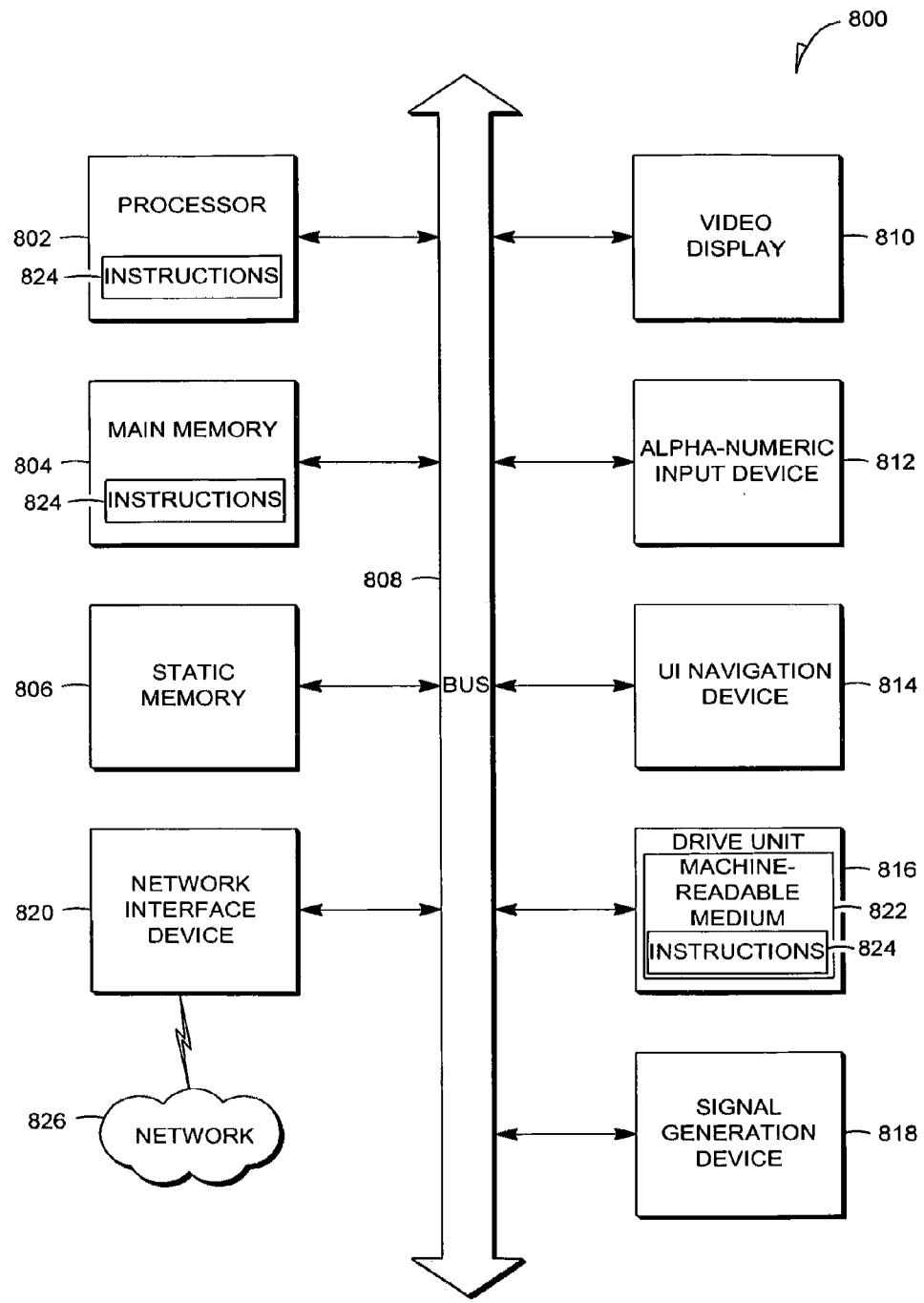
FIG. 8 is a block diagram of machine in the example form of a computer system within which set instructions for causing the machine to perform any one or more of the methodologies discussed herein may be executed.

FIG. 8 is a block diagram of a machine in the example form of a computer system 800 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or client devices 222, 224, 226 in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a user interface (UI) navigation device 814 (e.g., a mouse), a disk drive unit 816, a signal generation device 818 (e.g., a speaker) and a network interface device 820.

Machine-Readable Medium

The disk drive unit 816 includes a machine-readable medium 822 on which is stored one or more sets of instructions 824 and data structures (e.g., software) embodying or utilized by any one or more of the methodologies or functions described herein. The software 824 may also reside, completely or at least partially, within the main memory 804 and/or within the processor 802 during execution thereof by the computer system 800, the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories and optical and magnetic media. Specific examples of machine-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 824 may further be transmitted or received over a communications network 826 using a transmission medium. The instructions 824 may be transmitted using the network interface device 820 and any one of a number of well-known transfer protocols (e.g., Hypertext Transfer Protocol (HTTP)). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible medium to facilitate communication of such software.

Modules, Components and Logic

Certain embodiments are described herein as including logic or a number of components, modules, or mechanisms. A component is a tangible unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a component that operates to perform certain operations as described herein In various embodiments, a component may be implemented mechanically or electronically. For example, a component may comprise dedicated circuitry or logic that is permanently configured (e.g., as a special-purpose processor) to perform certain operations. A component may also comprise programmable logic or circuitry (e.g., as encompassed within a general-purpose processor or other programmable processor) that is temporarily configured by software to perform certain operations. It will be appreciated that the decision to implement a component mechanically, in dedicated and permanently configured circuitry, or in temporarily configured circuitry (e.g., configured by software), may be driven by cost and time considerations.

Accordingly, the term "component" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components are temporarily configured (e.g., programmed), each of the components need not be configured or instantiated at any one instance in time. For example, where the components comprise a general-purpose processor configured using software, the general-purpose processor may be configured as respective different components at different times. Software may accordingly configure a processor, for example, to constitute a particular component at one instance of time and to constitute a different component at a different instance of time.

Components can provide information to, and receive information from, other components. Accordingly, the described components may be regarded as being communicatively coupled. Where multiple of such components exist contemporaneously, communications may be achieved through signal transmission (e.g., over appropriate circuits and buses) that connect the components. In embodiments in which multiple components are configured or instantiated at different times, communications between such components may be achieved, for example, through the storage and retrieval of information in memory structures to which the multiple components have access. For example, one component may perform an operation and store the output of that operation in a memory device to which it is communicatively coupled. A further component may then, at a later time, access the memory device to retrieve and process the stored output. Components may also initiate communications with input or output devices, and can operate on a resource (e.g., a collection of information).

Although certain specific example embodiments are described herein, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments are described and illustrated in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A method comprising:
   sorting a dataset according to a first attribute of the data in the dataset into a first order;
   paginating the dataset dynamically based on context by dividing the dataset into a first plurality of subsets, the dividing based on the first attribute of the data in the dataset;
   presenting at least a first portion of the dataset, via a user interface, in the first order;
   presenting a first navigation control to navigate between the first plurality of subsets, the first navigation control relating to the first attribute of the data in the dataset, the first navigation control having a user-selectable link for each subset in the plurality of subsets, the link identifying a range of values for the data corresponding with the first data attribute by which the dataset has been ordered and paginated dynamically based on the context;
   sorting the dataset according to a second attribute of the data in the dataset into a second order;
   paginating the dataset dynamically based on the context by dividing the dataset into a second plurality of subsets, the dividing based on the second attribute of the data in the dataset;
   presenting at least a second portion of the dataset, via the user interface, in the second order; and
   presenting a second navigation control to navigate between the second plurality of subsets, the second navigation control relating to the second attribute of the data in the dataset, the second navigation control having a user-selectable link for each subset in the plurality of subsets, the link identifying a range of values for the data corresponding with the second data attribute by which the dataset has been ordered and paginated dynamically based on the context.

2. The method of claim 1, wherein the presenting of at least the first portion of the dataset includes generating a plurality of presentation pages, each of the plurality of presentation pages including a respective subset of the first plurality of subsets.

3. The method of claim 1, wherein the first attribute is at least of an alphabetic attribute, a numeric attribute, or an alphanumeric attribute, and the first navigation control displays a plurality of attribute values that are associated with respective subsets of the first plurality of subsets.

4. The method of claim 3, wherein each of the plurality of attribute values is selectable to navigate to an associated subset of the first plurality of subsets.

5. The method of claim 1, wherein the presenting of the first navigation control includes presenting the first navigation control on a first page of a plurality of presentation pages, the first navigation control enabling navigation to other pages of the plurality of presentation pages.

6. The method of claim 5, wherein the navigation control identifies the plurality of presentation pages by a respective attribute value for the first attribute according to which the dataset is sorted.

7. The method of claim 1, including associating a navigation anchor with each of the subsets of the first plurality of subsets, and the presenting of the first navigation control includes presenting a plurality of navigation indicia, each of the plurality of navigation indicia associated with the respective navigation anchor and selectable to navigate to an associated navigation anchor.

8. The method of claim 1, wherein the dividing of the dataset into the first plurality of subsets comprises dividing the dataset such that substantially all of the plurality of subsets includes an equal number of data items of the dataset.

9. The method of claim 1, wherein the presenting of at least the first portion of the dataset via the user interface comprises displaying the dataset in a table having a plurality of columns, each of the columns being associated with a respective attribute of a plurality of attributes of data items included within the dataset.

10. The method of claim 9, including receiving input of the first attribute and performing the sorting of the dataset according to the first attribute responsive to the receiving of the input of the first attribute.

11. The method of claim 10, wherein the receiving of the input of the first attribute includes detecting selection of a column of the table associated with the first attribute.

12. A method comprising:
   sorting a dataset according to a first criterion to generate a first sorted dataset;
   paginating the first sorted dataset dynamically based on context by dividing the first sorted dataset into a first plurality of subsets, the dividing based on the first criterion;
   presenting at least a portion of the first sorted dataset within a user interface;
   presenting, within the user interface, a first navigation control to navigate between the first plurality of subsets of the first sorted dataset, wherein the first navigation control presents a first plurality of selectable indicia, respectively associated with the first plurality of subsets of the first sorted dataset, the first plurality of selectable indicia each reflecting a range of values for the first criterion;
   sorting the dataset according to a second criterion to generate a second sorted dataset;
   paginating the second sorted dataset dynamically based on context by dividing the second sorted dataset into a second plurality of subsets, the dividing based on the second criterion;
   presenting at least a portion of the second sorted dataset within the user interface; and
   replacing the first navigation control with a second navigation control to navigate between the second plurality of subsets of the second sorted dataset, wherein the second navigation control presents a second plurality of selectable indicia, respectively associated with the second plurality of subsets of the second sorted dataset, the second plurality of selectable indicia each incorporating a value for the second criterion according to which the second sorted dataset is sorted.

13. The method of claim 12, wherein the presenting of at least the portion of the first sorted set comprises presenting a first page of a plurality of presentation pages, each of the plurality of presentation pages incorporating a respective subset on the plurality of subsets.

14. A system to present a dataset, the system comprising:
a processor-implemented data component to:
sort the dataset according to a first attribute of the data in the dataset into a first order, and paginate the dataset dynamically based on context by dividing the dataset into a first plurality of subsets, the dividing based on the first attribute of the data in the dataset, and
sort the dataset according to a second attribute into a second order, and paginate the dataset dynamically based on the context by dividing the dataset into a second plurality of subsets, the dividing based on the second attribute of the data in the dataset; and
a processor-implemented interface component to:
present at least a first portion of the dataset, via a user interface, in the first order, and to present a first navigation control to navigate between the first plurality of subsets, the first navigation control relating to the first attribute of the data in the dataset, the first navigation control having a user-selectable link for each subset in the plurality of subsets, the link identifying a range of values for the data corresponding with the first data attribute by which the dataset has been ordered and
present at least a second portion of the dataset, via the user interface, in the second order, and present a second navigation control to navigate between the second plurality of subsets, the second navigation control relating to the second attribute, the second navigation control having a user-selectable link for each subset in the plurality of subsets, the link identifying a range of values for the data corresponding with the second data attribute by which the dataset has been ordered.

15. The system of claim 14, wherein the interface component is to present at least the first portion of the dataset by generating a plurality of presentation pages, each of the plurality of presentation pages including a respective subset of the first plurality of subsets.

16. The system of claim 15, wherein the interface component is to present the first navigation control on a first page of the plurality of presentation pages, the first navigation control enabling navigation to other pages of the plurality of presentation pages.

17. The system of claim 16, wherein the navigation control is to identify the plurality of presentation pages by a respective attribute value for the first attribute according to which the dataset is sorted.

18. The system of claim 14, wherein the first attribute is an alphabetic attribute, the data component is to sort the dataset according to the first attribute by performing an alphabetical sort of the dataset, and the first navigation control is an alphabetical navigational control that displays a plurality of alphabetical attribute values that are associated with respective subsets of the first plurality of subsets.

19. The system of claim 18, wherein each of the plurality of alphabetical attribute values is selectable to navigate to an associated subset of the first plurality of subsets.

20. The system of claim 14, wherein the first attribute is a numeric attribute, the data component is to sort the dataset according to the first attribute by performing a numeric sort of the dataset, and the first navigation control is a numeric navigational control that displays a plurality of numeric attribute values that are associated with respective subsets of the first plurality of subsets.

21. The system of claim 20, wherein each of the plurality of numeric attribute values is selectable to navigate to an associated subset of the first plurality of subsets.

22. The system of claim 14, wherein the interface component is to associate a navigation anchor with each of the subsets of the first plurality of subsets, and to present the first navigation control as including a plurality of navigation indicia, each associated with the respective navigation anchor and being selectable to navigate to an associated navigation anchor.

23. The system of claim 14, wherein the data component is to divide the dataset such that substantially all of the plurality of subsets includes an equal number of data items of the dataset.

24. The system of claim 14, wherein the interface component is to display the dataset in a table having a plurality of columns, each of the columns being associated with a respective attribute of a plurality of attributes of data items included within the dataset.

25. The system of claim 24, wherein the interface component is to receive input of the first attribute, and the data component is to perform the sorting of the dataset according to the first attribute, responsive to the receiving of the input of the first attribute.

26. The system of claim 25, wherein the interface component is to receive a selection of a column of the table associated with the first attribute.

27. A machine-readable storage medium embodying instructions that, when executed by one or more processors, cause the one or more processors to perform a method comprising:
sorting a dataset according to a first criterion to generate a first sorted dataset;
paginating the first sorted dataset dynamically based on context by dividing the first sorted dataset into a first plurality of subsets, the dividing based on the first criterion;
presenting at least a portion of the first sorted dataset within a user interface;
presenting, within the user interface, a first navigation control to navigate between the first plurality of subsets of the first sorted dataset, wherein the first navigation control presents a first plurality of selectable indicia, respectively associated with the first plurality of subsets of the first sorted dataset, the first plurality of selectable indicia each reflecting a range of values for the first criterion;
sorting the dataset according to a second criterion to generate a second sorted dataset;
paginating the second sorted dataset dynamically based on context by dividing the second sorted dataset into a second plurality of subsets, the dividing based on the second criterion;
presenting at least a portion of the second sorted dataset within the user interface; and
replacing the first navigation control with a second navigation control to navigate between the second plurality of subsets of the second sorted dataset, wherein the second navigation control presents a second plurality of selectable indicia, respectively associated with the second plurality of subsets of the second sorted dataset, the second plurality of selectable indicia each incorporating a value for the second criterion according to which the second sorted dataset is sorted.

* * * * *